United States Patent
Hirono et al.

(10) Patent No.: US 8,991,246 B2
(45) Date of Patent: Mar. 31, 2015

(54) GEAR MEASURING METHOD

(75) Inventors: Yoko Hirono, Tokyo (JP); Takahide Tokawa, Tokyo (JP); Naohiro Otsuki, Tokyo (JP); Yoshihiro Nose, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 303 days.

(21) Appl. No.: 13/512,608

(22) PCT Filed: Sep. 15, 2010

(86) PCT No.: PCT/JP2010/065912
§ 371 (c)(1),
(2), (4) Date: Jun. 18, 2012

(87) PCT Pub. No.: WO2011/077792
PCT Pub. Date: Jun. 30, 2011

(65) Prior Publication Data
US 2012/0247199 A1    Oct. 4, 2012

(30) Foreign Application Priority Data
Dec. 22, 2009    (JP) ................................. 2009-290330

(51) Int. Cl.
*G01M 13/02*    (2006.01)
*G01B 5/20*    (2006.01)
*G01B 5/008*    (2006.01)

(52) U.S. Cl.
CPC ................ *G01B 5/202* (2013.01); *G01B 5/008* (2013.01); *G01M 13/021* (2013.01)
USPC .................. 73/162; 73/104; 73/105; 33/503; 33/551; 33/556; 33/559

(58) Field of Classification Search
USPC ....................... 73/162, 104, 105; 33/503, 551, 33/554–556, 558, 559, 561; 850/1–63
See application file for complete search history.

(56) References Cited

U.S. PATENT DOCUMENTS

| | | | |
|---|---|---|---|
| 5,343,626 A * | 9/1994 | Nagata ....................... | 33/501.14 |
| 6,154,713 A | 11/2000 | Peter et al. | |
| 6,220,084 B1 * | 4/2001 | Chen et al. ....................... | 73/105 |
| 6,318,159 B1 * | 11/2001 | Chen et al. ....................... | 73/105 |
| 7,100,429 B2 * | 9/2006 | Matsuki et al. ................. | 73/105 |

(Continued)

FOREIGN PATENT DOCUMENTS

| | | |
|---|---|---|
| CN | 1924521 A | 3/2007 |
| JP | 5-111851 A | 5/1993 |

(Continued)

OTHER PUBLICATIONS

Japanese Office Action dated Jan. 22, 2013 with English Translation.

(Continued)

*Primary Examiner* — Hezron E Williams
*Assistant Examiner* — Hoang Nguyen
(74) *Attorney, Agent, or Firm* — Birch, Stewart, Kolasch & Birch, LLP

(57) ABSTRACT

A gear measuring method allows multi-point continuous measurement using a touch probe and is capable of reducing measuring time compared with known methods. For example, a base action for moving a sensing element of a touch probe along an ideal tooth form line of a workpiece (gear; W) or a tooth form line determined by calculation by controlling the movement of the sensing element and the rotation of the workpiece (W) and, in addition, an oscillation action for receiving first signals (ON signals or OFF signals) from the touch probe by bringing the sensing element into contact with the tooth surface of the workpiece during the base action and subsequently for receiving second signals (OFF signals or ON signals) from the touch probe by moving the touch probe in a direction along which the sensing element is separated from the tooth surface of the workpiece are continuously performed.

4 Claims, 9 Drawing Sheets

(56) References Cited

U.S. PATENT DOCUMENTS

| | | | |
|---|---|---|---|
| 7,159,452 B2 * | 1/2007 | Saito | 73/105 |
| 7,617,720 B2 * | 11/2009 | Okajima et al. | 73/105 |
| 7,784,333 B2 * | 8/2010 | Nemoto et al. | 73/105 |
| 7,814,779 B2 * | 10/2010 | Igasaki et al. | 73/105 |
| 7,869,970 B2 * | 1/2011 | Nemoto et al. | 702/95 |
| 8,573,036 B2 * | 11/2013 | Igasaki et al. | 73/105 |
| 2007/0295100 A1 | 12/2007 | Igasaki et al. | |

FOREIGN PATENT DOCUMENTS

| | | | |
|---|---|---|---|
| JP | 5-264214 A | 10/1993 |
| JP | 8-285512 A | 11/1996 |
| JP | 10 300455 A | 11/1998 |
| JP | 2000-292145 A | 10/2000 |
| JP | 2000-292160 A | 10/2000 |
| JP | 2001-99639 A | 4/2001 |
| JP | 2007-64891 A | 3/2007 |
| JP | 2007-279012 A | 10/2007 |

OTHER PUBLICATIONS

Chinese Office Action dated Dec. 4, 2013 from corresponding Chinese Application No. 201080054444.3 with an English translation.

* cited by examiner

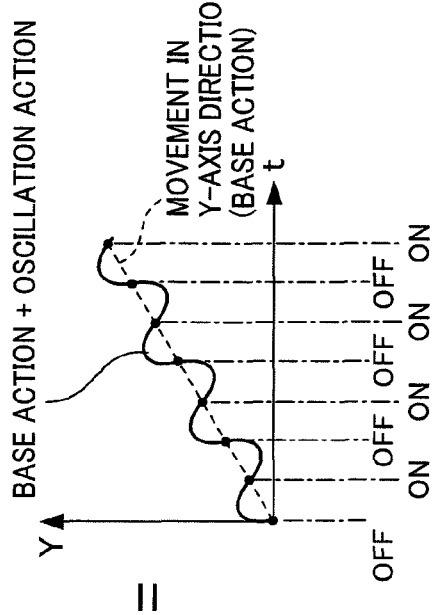
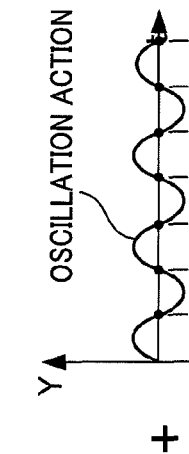
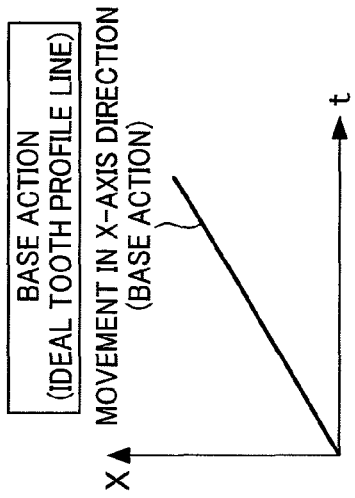
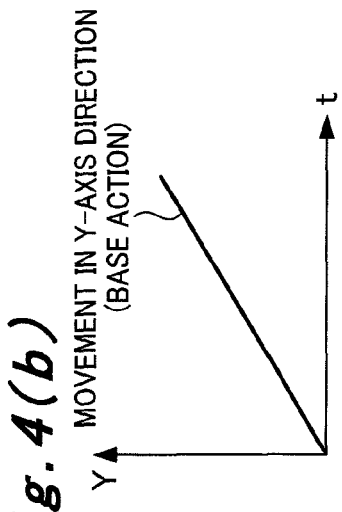
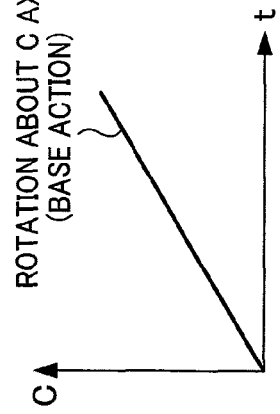

| BASE ACTION (IDEAL TOOTH PROFILE LINE) | OSCILLATION ACTION | CASE No |
|---|---|---|
| X·Y·C | Y | 1 |
|  | X·Y | 2 |
|  | C | 3 |
| X·C | Y | 4 |
|  | C | 5 |
| Y·C | Y | 6 |
|  | C | 7 |

| BASE ACTION (IDEAL TOOTH TRACE LINE) | OSCILLATION ACTION | CASE No |
|---|---|---|
| Z·C | Y | 11 |
| | C | 12 |
| Z·X·Y | Y | 13 |
| | X·Y | 14 |
| | C | 15 |

GEAR MEASURING METHOD

TECHNICAL FIELD

The present invention relates to a gear measuring method for measuring the tooth profile and tooth trace of a gear.

BACKGROUND ART

As gear machining equipment, there are gear shaping machines and hobbing machines configured to manufacture a gear by cutting, gear grinding machines configured to grind a quenched gear, and the like.

In machining a gear with such gear machining equipment, at least one gear taken out from a lot having undergone the machining is subjected to gear measurement such as tooth profile and tooth trace measurement with a gear measuring device to check the machining accuracy. If the machining accuracy is good, the machining with the gear machining equipment is continued for the remaining lots. If the machining accuracy is poor, the machining accuracy of the gear machining equipment is corrected, and the remaining lots are then machined. Meanwhile, in a case of a large gear, producing a defective product is unacceptable. Thus, a stock amount is left on the gear, and gear machining with gear machining equipment and gear measurement with a gear measuring device are repeated several times, and after the final accuracy is checked, finishing is performed.

Conventional gear measuring devices are usually separate from gear machining equipment. In this case, a work of transferring a machined gear from the gear machining equipment to the gear measuring device is necessary. In this respect, in recent years, various types of gear machining equipment equipped integrally with a gear measuring device have been proposed for the purpose of eliminating the gear transferring work to improve the workability.

Meanwhile, as a measuring probe used in the gear measuring device, there are a continuous scanning probe and a touch probe. The continuous scanning probe is an analog measuring probe and configured to move its sensing element in continuous contact with the tooth surface of a gear and measure the tooth surface on the basis of the amount of displacement of the sensing element in the movement. On the other hand, the touch probe is a digital (ON/OFF type) measuring probe. The touch probe is superior to the continuous scanning probe in environmental resistances such as humidity resistance and dust resistance, and is therefore particularly useful in a case where the gear measuring device is provided on the gear machining equipment. Moreover, the touch probe is lower in cost than the continuous scanning probe, and is therefore very useful from the viewpoint of cost reduction of the gear machining equipment.

To describe the touch probe on the basis of FIG. 11, a touch probe 1 is configured such that its sensing element 2 is normally held in a state shown by the solid line in FIG. 11. The touch probe 1 is turned on (in a case of an internal switch with a form a contact; the touch probe 1 is turned off in a case of a form b contact) as the sensing element 2 of the touch probe 1 approaches a tooth surface 3a of a gear 3 as shown by an arrow A, contacts the tooth surface 3a as shown by the dashed lines in FIG. 11, and is displaced by a pre-travel amount Δ (e.g., about several tens of μm). Then, the tooth profile and the tooth trace are measured on the basis of coordinates on drive axes at the moment when the touch probe 1 is turned on (or off), and the like.

Accordingly, to measure the next measuring point, it is necessary to move the sensing element 2 in a direction away from the tooth surface 3a as shown by an arrow B or move the tooth surface 3a in a direction away from the sensing element 2 to once turn off the touch probe 1 (in the case of the internal switch with the form a contact; the touch probe 1 is turned on in the case of the form b contact).

To describe these actions on the basis of FIG. 12, in a case of measurement at measuring points P1 to P4 on the tooth surface 3a for example, the touch probe 1 is first moved in an X-axis direction to set the sensing element 2 to a position corresponding to the first measuring point P1. Then, the sensing element 2 is moved in a Y-axis direction or the gear 3 is turned about a C axis (the rotation center of the gear 3) to bring the sensing element 2 closer to the tooth surface 3a as shown by an arrow A and further into contact with the measuring point P1, so that the touch probe 1 is turned on (the case with a form a contact is described here). Subsequently, the sensing element 2 is moved backward along the Y axis or the gear 3 is turned backward about the C axis to separate the sensing element 2 from the tooth surface 3a as shown by an arrow B, so that the touch probe 1 is turned off and returned to the initial set position. Thereafter, the sensing element 2 is moved in the X-axis direction as shown by an arrow D and set to a position corresponding to the second measuring point P2. In the subsequent process, the same actions are repeated for each of the measuring points P2 to P4.

PRIOR ART DOCUMENT

Patent Document

Patent Document 1: Japanese Patent Application Publication No. Hei 05-111851

SUMMARY OF THE INVENTION

Problem to be Solved by the Invention

The conventional gear measuring method requires a long measuring time since it is necessary to repeat, for every measuring point, the intermittent actions of setting the sensing element 2 to a position corresponding to the measuring point, bringing the sensing element 2 into contact with the measuring point (tooth surface) to turn on the touch probe 1, and separating the sensing element 2 from the measuring point (tooth surface) to turn off the touch probe 1, as described above. In addition, to increase the measurement accuracy, the pitch of measuring points needs to be shortened, which increases the number of measuring points; however, a longer measuring time is required for an increased number of measuring points. In other words, the number of measuring points (measurement accuracy) and the measuring time are in a trade-off relationship.

Thus, in view of the above circumstances, an object of the present invention is to provide a gear measuring method by which many measuring points can be continuously measured (multi-point continuous measurement) with a touch probe and which can reduce the measuring time as compared with conventional methods.

Means for Solving the Problem

A gear measuring method of a first invention for solving the above problem is for measuring any one of a tooth profile and a tooth trace of a gear by using a touch probe, the method characterized in that the method comprises the steps of:

performing a base action for moving a sensing element of the touch probe along any one of an ideal tooth profile line of the gear and a computed tooth profile line by controlling movement of the sensing element and rotation of the gear, or along any one of an ideal tooth trace line of the gear and a computed tooth trace line by controlling movement of the sensing element and rotation of the gear or by controlling the movement of the sensing element, during the base action, performing continuously any one of
an oscillation action for bringing the sensing element into contact with a tooth surface of the gear to receive a first signal from the touch probe and thereafter moving the touch probe in a direction allowing the sensing element to move away from the tooth surface of the gear to receive a second signal from the touch probe, and an oscillation action for bringing the tooth surface of the gear into contact with the sensing element to receive the first signal from the touch probe and thereafter moving the tooth surface of the gear in a direction away from the sensing element to receive the second signal from the touch probe.

The gear measuring method of a second invention, in the gear measuring method of the first invention, is characterized in that the method is for measuring the tooth profile of the gear, the base action for moving the sensing element along the any one of the ideal tooth profile line and the computed tooth profile line is performed by controlling movement of the sensing element in an X-axis direction perpendicular to a rotation center of the gear and in a Y-axis direction perpendicular to the X-axis direction and parallel to a radial direction of the gear, and rotation of the gear about a C axis coaxial with the rotation center, and the oscillation action is performed with respect to any one of the movement of the sensing element in the Y-axis direction, the movement of the sensing element in the X-axis direction and the Y-axis direction, and the rotation of the gear about the C axis.

The gear measuring method of a third invention, in the gear measuring method of the second invention, is characterized in that in the base action, any one of an amount of the movement of the sensing element in the X-axis direction and an amount of the movement of the sensing element in the Y-axis direction is set to 0, and the oscillation action is performed with respect to any one of the movement of the sensing element in the Y-axis direction and the rotation of the gear about the C axis.

The gear measuring method of a fourth invention, in the gear measuring method of the first invention, is characterized in that the method is for measuring the tooth trace of the gear, the base action for moving the sensing element along the any one of the ideal trace profile line and the computed tooth trace line is performed by controlling movement of the sensing element in a Z-axis direction parallel to a rotation center of the gear and rotation of the gear about a C axis coaxial with the rotation center, or by controlling movement of the sensing element in the Z-axis direction, in an X-axis direction perpendicular to the rotation center, and in a Y-axis direction perpendicular to the X-axis direction and parallel to a radial direction of the gear, and the oscillation action is performed with respect to any one of the movement of the sensing element in the Y-axis direction and the rotation of the gear about the C axis, or with respect to any one of the movement of the sensing element in the Y-axis direction, the movement of the sensing element in the X-axis direction and the Y-axis direction, and the rotation of the gear about the C axis.

Effects of the Invention

According to a gear measuring method of the present invention, in the gear measuring method for measuring any one of a tooth profile and a tooth trace of a gear by using a touch probe, the method is characterized in that the method comprises the steps of: performing a base action for moving a sensing element of the touch probe along any one of an ideal tooth profile line of the gear and a computed tooth profile line by controlling movement of the sensing element and rotation of the gear, or along any one of an ideal tooth trace line of the gear and a computed tooth trace line by controlling movement of the sensing element and rotation of the gear or by controlling the movement of the sensing element, during the base action, performing continuously any one of an oscillation action for bringing the sensing element into contact with a tooth surface of the gear to receive a first signal from the touch probe and thereafter moving the touch probe in a direction allowing the sensing element to move away from the tooth surface of the gear to receive a second signal from the touch probe, and an oscillation action for bringing the tooth surface of the gear into contact with the sensing element to receive the first signal from the touch probe and thereafter moving the tooth surface of the gear in a direction away from the sensing element to receive the second signal from the touch probe. Thus, performing the oscillation action along with the base action allows continuous switching between the first signal and the second signal (continuous ON/OFF switching) of the touch probe.

Accordingly, the time required for tooth profile measurement or tooth trace measurement can be significantly reduced as compared to the conventional method. Moreover, the number of measuring points can be easily increased by simply changing the frequency of the oscillation action. Thus, a long measuring time, which is required in the conventional case, is no longer required even when the number of measuring points is increased.

BRIEF DESCRIPTION OF THE DRAWINGS

FIG. 4 is a diagram showing actions (base action and oscillation action) along/about drive axes (X axis, Y axis, and C axis) performed in the tooth profile measurement with the gear measuring device.

MODES FOR CARRYING OUT THE INVENTION

Hereinbelow, embodiments of the present invention will be described in detail on the basis of the drawings.

<Configuration of Gear Measuring Device>

Figure 1:
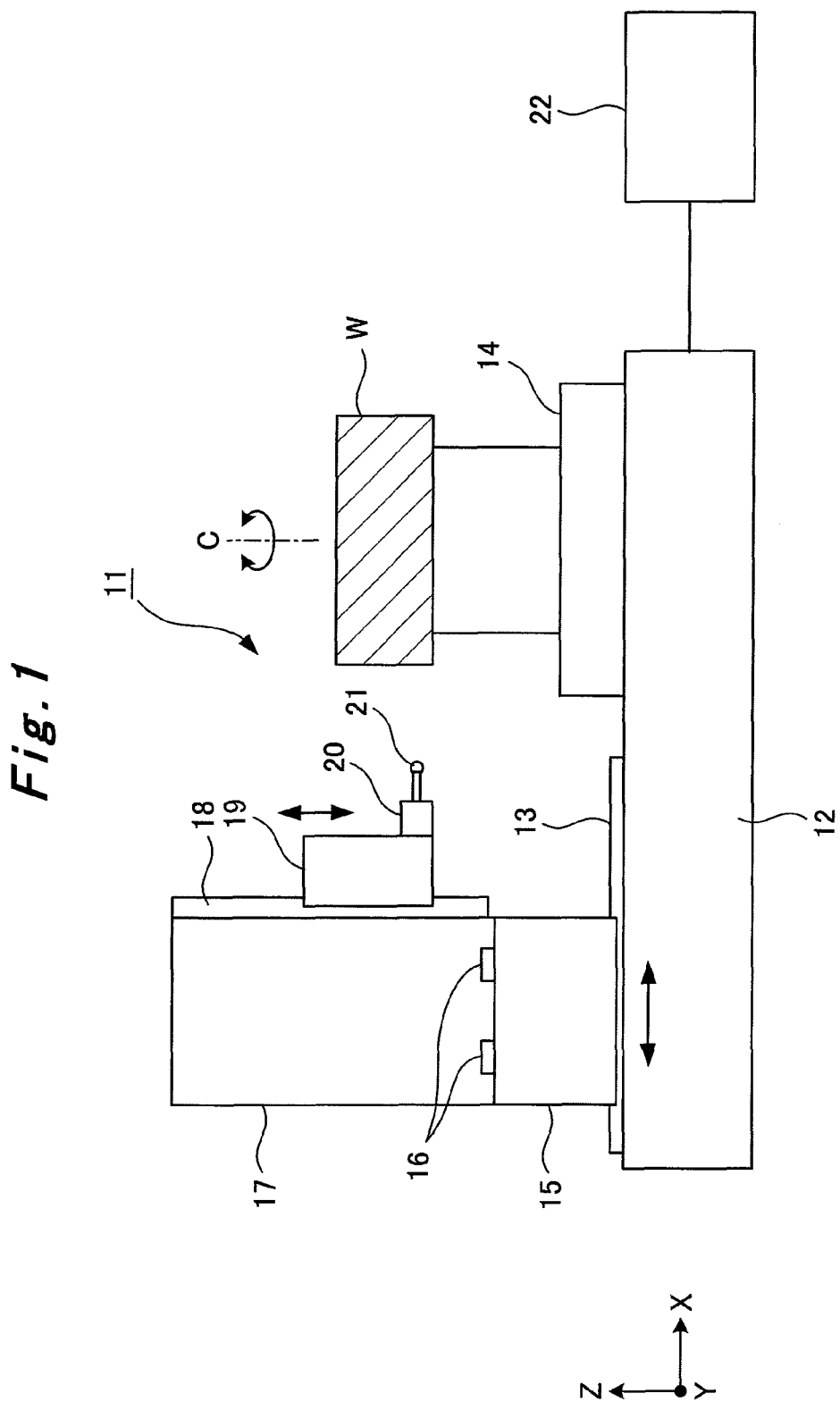
FIG. 1 is a configuration diagram of a gear measuring device which implements a gear measuring method of an embodiment of the present invention.

Based on FIG. 1, the description will be first given of the configuration of a gear measuring device 11 which implements a gear measuring method of an embodiment of the present invention. Note that the gear measuring method of the present invention is applicable to both a gear measuring device installed integrally on gear machining equipment (onboard gear measuring device) and a gear measuring device separate from gear machining equipment. However, using a touch probe excellent in environmental resistance and low in cost, the gear measuring method of the present invention is particularly suitable for an onboard gear measuring device, and allows cost reduction as well.

As shown in FIG. 1, on a base 12 of the gear measuring device 11, there are disposed guide rails 13 extending in the direction of an X axis being a horizontal drive axis, and a rotary table 14 situated in front of the guide rails 13. The rotary table 14 is configured to rotate about a C axis being a rotational drive axis extending in the vertical direction. Above the rotary table 14, a workpiece W, or a gear, is placed such that the rotation center of the workpiece W and the C axis of the rotary table 14 may be coaxial with each other. Thus, the workpiece W rotates also about the C axis (rotation center) together with the rotary table 14.

A movable body 15 is capable of moving straight in the X-axis direction along the guide rails 13. On the movable body 15, guide rails 16 are disposed extending in the direction of a Y axis being a horizontal drive axis (in the direction normal to the sheet of FIG. 1). A movable body 17 is capable of moving straight in the Y-axis direction along the guide rails 16. On the movable body 17, guide rails 18 are disposed extending in the direction of a Z axis being a vertical drive axis. A movable body 19 is capable of moving straight in the Z-axis direction along the guide rails 18.

Note that the X-axis direction is a direction perpendicular to the rotation center of the workpiece W; the Y-axis direction is a direction perpendicular to the X-axis direction and parallel to the radial direction of the workpiece W; and the Z-axis direction is a direction parallel to the rotation center of the workpiece W (i.e., the C axis).

A touch probe 20 includes a sensing element 21 and is attached to the movable body 19. Thus, the touch probe 20 (sensing element 21) can be moved in the X-axis direction, the Y-axis direction, and the Z-axis direction by moving the movable bodies 15, 17, and 19 in the X-axis direction, the Y-axis direction, and the Z-axis direction, respectively, and therefore is capable of three-dimensional movements.

Note that the description will be given here by assuming that the internal switch of the touch probe 20 is of a form a contact type. The ON and OFF will be the reverse of the form a contact type if the internal switch of the touch probe 20 is of a form b contact type.

A control/computation device 22 is configured to perform total control on actions along/about the drive axes (X axis, Y axis, Z axis, and C axis) of the gear measuring device 11 and to perform computation of measurement signals.

Specifically, based on the gear specification of the workpiece W set and stored in advance, the position (coordinates) of the touch probe 20 (sensing element 21), the position to measure the tooth profile, the position to measure the tooth trace, and the like, the control/computation device 22 controls the movements of the movable bodies 15, 17, and 19 in the X-, Y-, and Z-axis directions to thereby control the movement of the touch probe 20 (sensing element 21) in the X-, Y-, and Z-axis directions and also to control the C-axis rotation of the rotary table 14 on which the workpiece W is placed.

Moreover, the control/computation device 22 receives an ON signal (first signal) and an OFF signal (second signal) from the touch probe 20, extracts the coordinates on the X, Y, and Z axes and the rotational angle about the C axis at the moment when the ON signal is received, and performs computation based thereon to determine the tooth profile and the tooth trace of the workpiece W.

<Tooth Profile Measurement>

Next, based on FIGS. 1 to 7, description will be given of a method for performing tooth profile measurement with the gear measuring device 11 on the basis of the control and computation of the control/computation device 22.

Figure 2:
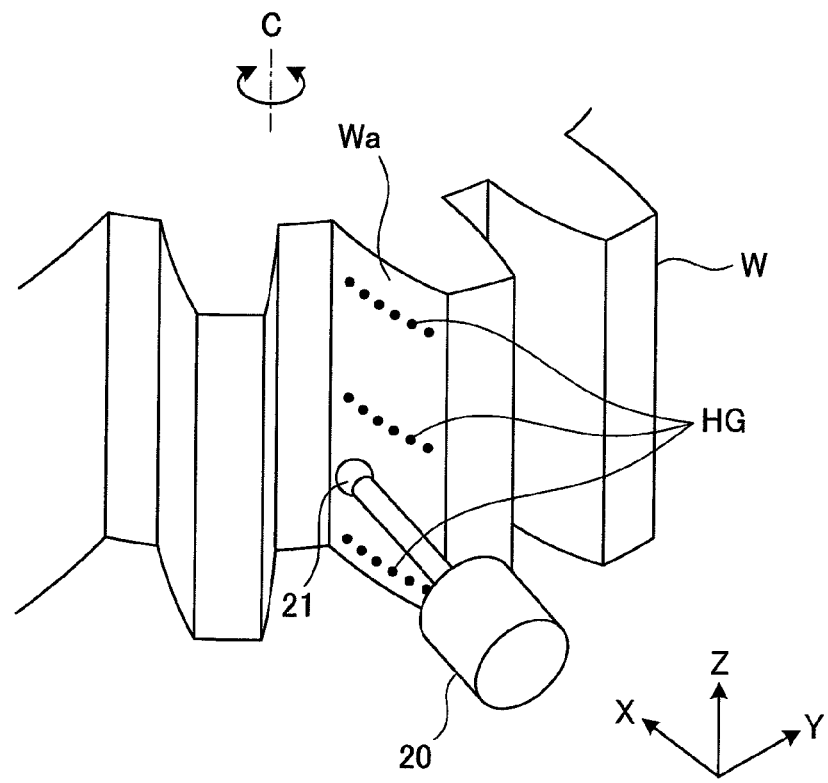
FIG. 2 is a diagram showing how tooth profile measurement is performed with the gear measuring device.
Figure 3:
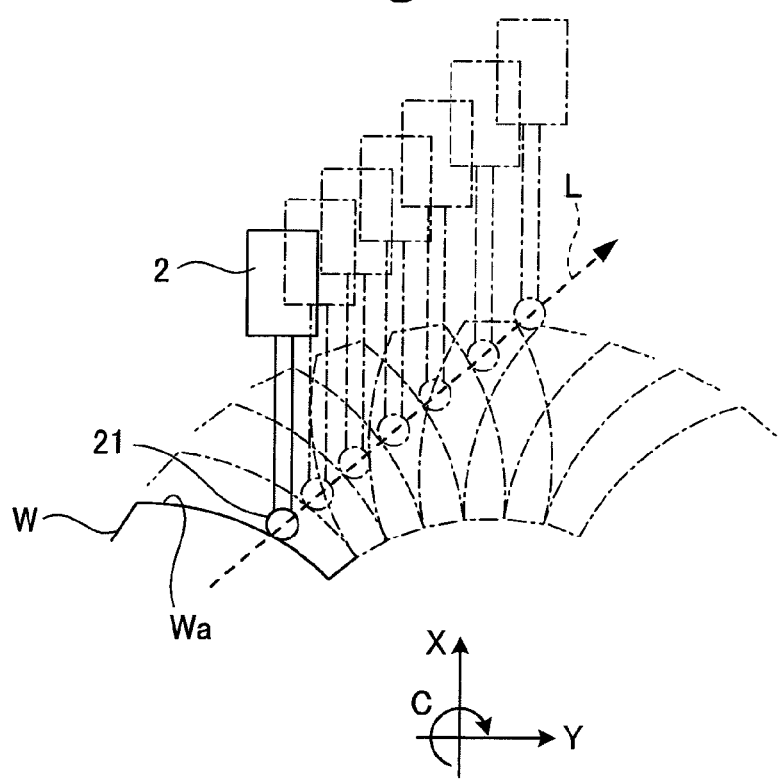
FIG. 3 is a diagram showing actions which a touch probe and a gear (tooth surface) exhibit in the tooth profile measurement with the gear measuring device.

In a case of measuring each line of tooth profile HG of a tooth surface Wa of the workpiece W through multi-point continuous measurement using the touch probe 20 as shown in FIG. 2, a base action as shown in FIG. 3 for example is superimposed on an oscillation action.

Here, the base action refers to an action for moving the sensing element 21 of the touch probe 20 along an ideal tooth profile line of the tooth surface Wa of the workpiece W.

Moreover, the oscillation action refers to an action for oscillating (vibrating) the sensing element 21 of the touch probe 20 to perform the following in a continuous manner: bringing the sensing element 21 into contact with the tooth surface Wa (i.e., pushing in and displacing the sensing element 21 by a pre-travel amount Δ) to turn on the touch probe 20 (i.e., to receive an ON signal from the touch probe 20), and thereafter moving the touch probe 20 in a direction allowing the sensing element 21 to move away from the tooth surface Wa to turn off the touch probe 20 (i.e., to receive an OFT signal from the touch probe 20). The oscillation action also refers to an action for oscillating the workpiece W to perform the following in a continuous manner: bringing the tooth surface Wa into contact with the sensing element 21 (i.e., pushing in and displacing the sensing element 21 by the pre-travel amount Δ) to turn on the touch probe 20 (i.e., to receive an ON signal from the touch probe 20), and thereafter moving the tooth surface Wa in a direction away from the sensing element 21 to turn off the touch probe 20 (i.e., to receive an OFF signal from the touch probe 20).

Note that when turning off the touch probe 20, the sensing element 21 and the tooth surface Wa do not necessarily have to be separated from each other. For example, the touch probe 20 is off if the sensing element 21 is only in contact with the tooth surface Wa. Thus, to switch the touch probe 20 from the ON state to the OFF state, it is only necessary to move the touch probe 20 in the direction allowing the sensing element 21 to move away from the tooth surface Wa, or to move the tooth surface Wa in the direction away from the sensing element 21, as described above.

To describe the measurement procedure in detail on the basis of FIG. 3, the workpiece W is first turned about the C axis to make a tooth space in the workpiece W face the sensing element 21 of the touch probe 20. Thereafter, the sensing element 21 is moved in the X-, Y-, and Z-axis directions to contact the tooth surface Wa of the workpiece W at a point where the tooth surface Wa and the dedendum circle intersect (a start point of the tooth profile measurement) to thereby turn on the touch probe 20. In other words, the sensing element 21 is positioned to the start point of the tooth profile measurement.

Subsequently, from this state, the sensing element 21 of the touch probe 20 is moved in an X/Y-axis direction to move obliquely in the direction of a tangential line L on the base circle of the workpiece W, and the workpiece W is turned about the C axis in synchronization with the oblique movement (oblique measurement method). Thus, the sensing element 21 performs a base action in which the sensing element 21 moves along the ideal tooth profile line (target tooth profile) of the workpiece W.

During this base action, the sensing element 21 also performs an oscillation action in the Y-axis direction. As a result, the touch probe 20 performs the base action while switching between ON and OFF in a continuous manner at each measuring point through the oscillation action.

Based on FIG. 4, the base action and the oscillation action will be described in detail. Part (a) of FIG. 4 shows movement (base action) of the sensing element 21 in the X-axis direction for moving the sensing element 21 along the ideal tooth profile line. In Part (a) of FIG. 4, the vertical axis represents the position (coordinate) in the X-axis direction while the horizontal axis represents time. Part (b) of FIG. 4 shows movement (base action) of the sensing element 21 in the Y-axis direction for moving the sensing element 22 along the ideal tooth profile line. In Part (b) of FIG. 4, the vertical axis represents the position (coordinate) in the Y-axis direction while the horizontal axis represents time. Part (c) of FIG. 4 shows turning (base action) of the workpiece W about the C axis for moving the sensing element 22 along the ideal tooth profile line. In Part (c) of FIG. 4, the vertical axis represents the rotational angle about the C axis while the horizontal axis represents time. By combining the movement of the sensing element 21 in the X/Y-axis direction and the rotation of the workpiece W about the C axis, the sensing element 21 can perform a base action allowing movement thereof along the ideal tooth profile line.

As for the Y-axis direction, an oscillation action as shown in Part (d) of FIG. 4 is superimposed on the base action in Part (b) of FIG. 4. Thus, the action of the sensing element 21 in the Y-axis direction results in an action in which the oscillation action in the Y-axis direction is superimposed on the base action in the Y-axis direction as shown in the solid line in Part (e) of FIG. 4. Note that in Parts (d) and (e) of FIG. 4, the vertical axis represents the position (coordinate) in the Y-axis direction while the horizontal axis represents time.

With the oscillation action being added to the base action in the Y-axis direction as described above, the touch probe 20 exhibits the base action in the Y-axis direction along with the oscillation action (i.e., repeatedly increasing and decreasing the moving speed in the Y-axis direction) as shown in Parts (d) and (e) of FIG. 4. Accordingly, the touch probe 20 repeats ON/OFF switching operations at a frequency corresponding to the frequency of the oscillation action. Specifically, during the base action, the oscillation action is continuously performed in which the sensing element 21 is brought into contact with the tooth surface Wa to turn on the touch probe 20 (i.e., to receive an ON signal from the touch probe 20), and thereafter the touch probe 20 is moved in the direction allowing the sensing element 21 to move away from the tooth surface Wa to turn off the touch probe 20 (i.e., to receive an OFF signal from the touch probe 20).

Note that described herein is an example where a sine periodic function is employed as the oscillation action, but the waveform of the oscillation action is not limited to this. The oscillation action may have any waveform as long as it changes periodically, and may have a triangular waveform, for example.

Moreover, the frequency of the oscillation action may be set shorter if the number of measuring points is to be increased to improve the accuracy of the tooth profile measurement. That is, the number of measuring points for the tooth profile measurement can be easily changed by simply changing the frequency of the oscillation action.

Furthermore, the frequency of the oscillation action is not necessarily limited to a fixed frequency such as the sine curve in the illustrated example. The frequency may be changed as needed such that different frequencies are set to a dedendum side and a tooth tip side, for example.

Meanwhile, when the amplitude of the oscillation action is too small, the oscillation action may be unable to securely bring the sensing element 21 into contact with the tooth surface Wa to turn on the touch probe 20 or to securely move the touch probe 20 in the direction allowing the sensing element 21 to move away from the tooth surface Wa to turn off the touch probe 20, depending on the size of the profile error present in the tooth surface Wa of the machined workpiece W. For this reason, the amplitude of the oscillation action may be set to a value greater than the largest profile error which may be found by estimating the largest value in the profile error that is possibly present in the tooth surface Wa of the machined workpiece W by conducting tests, referring to the gear accuracy classes provided by JIS, or doing the like, for example.

Note that in this case, the estimated value of the largest profile error may be changed based on which stage the grinding of the workpiece W is at, and the amplitude of the oscillation action may be set accordingly.

Figure 5A:
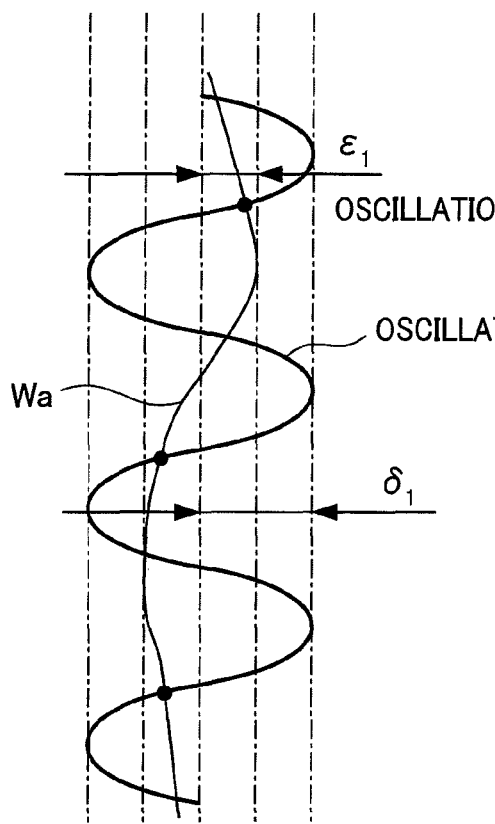
FIG. 5 is an explanatory diagram for the amplitude of the oscillation action.
Figure 5B:
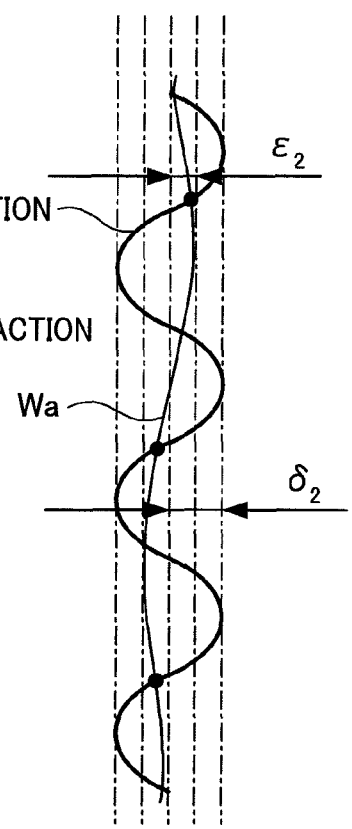

For example, as shown in Part (a) of FIG. 5, in tooth profile measurement of the workpiece W before or during grinding, the amplitude of the oscillation action may be set to an amplitude $\delta_1$ greater than a relatively large error $\epsilon_1$ (two times greater than $\epsilon_1$ in the illustrated example) which is estimated from the test results, the accuracy classes, or the like. As shown in Part (b) of FIG. 5, in tooth profile measurement of the workpiece W after grinding, the amplitude of the oscillation action may be set to an amplitude $\delta_2$ greater than a relatively small error $\epsilon_2$ (two times greater than $\epsilon_2$ in the illustrated example) which is estimated from the test results, the accuracy classes, or the like.

Figure 6A:
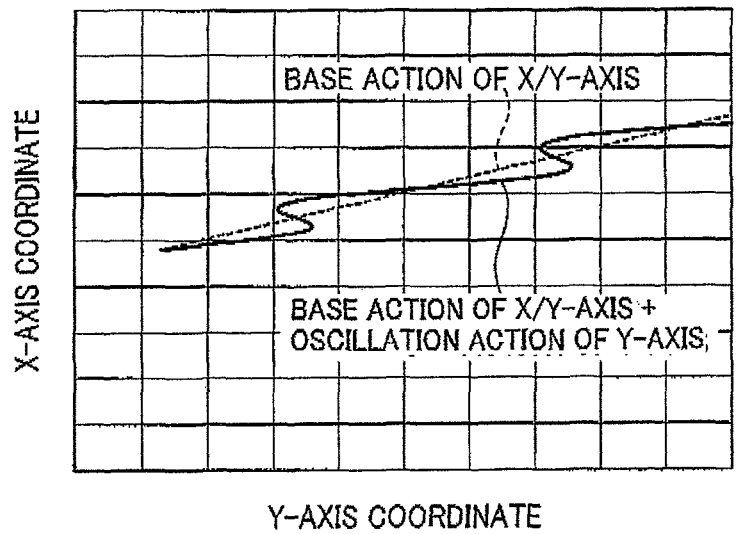
FIG. 6 is a diagram showing "the path of base action of the X/Y-axis+the oscillation action" performed in the tooth profile measurement with the gear measuring device.
Figure 6B:
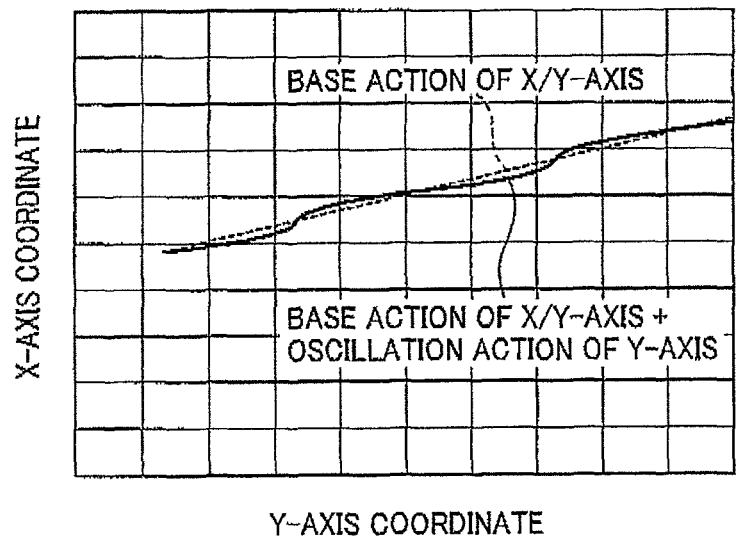

In the former case, there are relatively large variations in the path of the sensing element 21 in the X/Y-axis base action with the Y-axis oscillation action added thereto, as illustrated by the solid line in Part (a) of FIG. 6. On the other hand, there are relatively small variations in the path of the sensing element 21 in the X/Y-axis base action with the Y-axis oscillation action added thereto, as illustrated by the solid line in Part (b) of FIG. 6.

The description is given above of a case where the movement of the sensing element 21 in the X-axis direction and the Y-axis direction and the rotation of the workpiece W about the C axis are controlled to perform the base action for moving the sensing element 21 along the ideal tooth profile line and to perform the oscillation action with respect to movement of the sensing element 21 in the Y-axis direction. However, the combination of drive axes is not limited to this. Different combinations of drive axes may be used to perform the base action and the oscillation action.

Figures 7, 8:
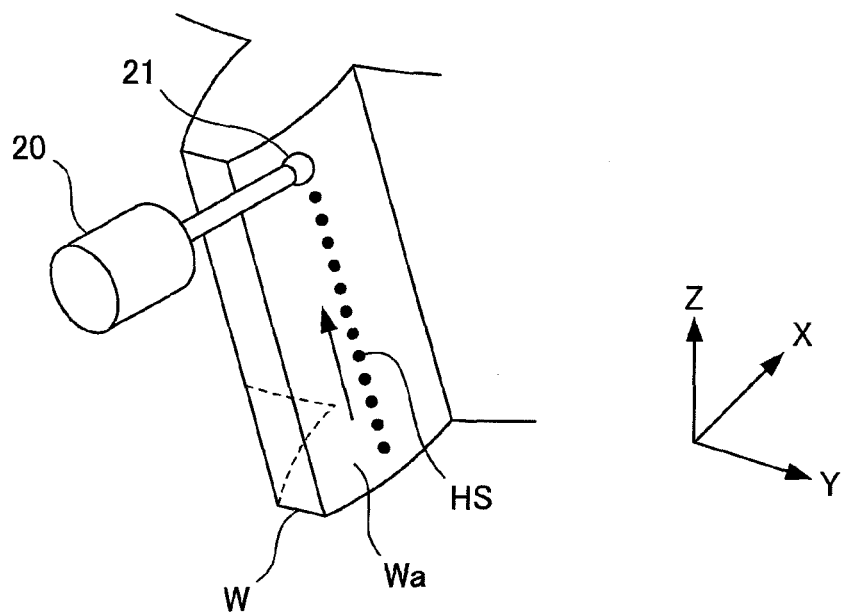
FIG. 7 is a table showing example combinations of drive axes for performing the base action and axis (axes) for performing the oscillation action in the tooth profile measurement with the gear measuring device.
FIG. 8 is a diagram showing how tooth trace measurement is performed with the gear measuring device.

To describe combinations of drive axes on the basis of FIG. 7, cases 1 to 7 are example combinations of drive axes for performing the base action and a drive axis (axes) for performing the oscillation action. Case 1 is the combination example of the case described above.

Besides case 1, if the X, Y, and C axes are to be used to perform the base action, the drive axes shown in case 2 or 3 may be used for the oscillation action. In case 2, the oscillation action is performed with respect to the movement of the sensing element 21 in the X-axis direction and the Y-axis direction (i.e., with respect to the movement of the sensing element 21 in the direction of the tangential line L on the base circle). In case 3, the oscillation action is performed with respect to the rotation of the workpiece W about the C axis (repeated acceleration and deceleration of the rotational speed). In this case, the oscillation action is continuously performed in which the tooth surface Wa is brought into contact with the sensing element 21 to turn on the touch probe 20 (i.e., to receive an ON signal from the touch probe 20) and thereafter the tooth surface Wa is moved in a direction away from the sensing element 21 to turn off the touch probe 20 (i.e., to receive an OFF signal from the touch probe 20).

Moreover, for the base action, the movement of the sensing element 21 in the X-axis direction and the rotation of the workpiece W about the C axis may be controlled to perform a base action for moving the sensing element 21 along the ideal tooth profile line. In this case, the workpiece W is turned about the C axis (base action) in synchronization with the movement of the sensing element 21 of the touch probe 20 in the X-axis direction (base action) (tooth-depth direction measurement method). This also makes it possible to move the sensing element 21 along the ideal tooth profile line.

Then, in this case, the drive axis shown in case 4 or 5 is used to perform the oscillation action. In case 4, the oscillation action is performed with respect to movement of the sensing element 21 in the Y-axis direction. In case 5, the oscillation action is performed with respect to the rotation of the workpiece W about the C axis.

Further, for the base action, the movement of the sensing element 21 in the Y-axis direction and the rotation of the workpiece W about the C axis may be controlled to perform a base action for moving the sensing element 21 along the ideal tooth profile line. In this case, the workpiece W is turned about the C axis (base action) in synchronization with the movement of the sensing element 21 of the touch probe 20 in the Y-axis direction (base action) (base-circle tangential-line direction measurement method). This also makes it possible to move the sensing element 21 along the ideal tooth profile line.

Then, in this case, the drive axis shown in case 6 or 7 is used to perform the oscillation action. In case 6, the oscillation action is performed with respect to the movement of the sensing element 21 in the Y-axis direction. In case 7, the oscillation action is performed with respect to the rotation of the workpiece W about the C axis.

Note that using the X and C axes to perform the base action can be regarded as setting the amount of the Y-axis movement of the sensing element 21 to 0 (i.e., not moving the sensing element 21 in the Y-axis direction) in the setting where the X, Y, and C axes are used to perform the base action. Moreover, using the Y and C axes to perform the base action can be regarded as setting the amount of the X-axis movement of the sensing element 21 to 0 (i.e., not moving the sensing element 21 in the X-axis direction) in the setting where the X, Y, and C axes are used to perform the base action.

In addition, each of the directions of the tooth profile measurement as described above is applicable regardless of whether the workpiece W is a helical gear or a spur gear.

<Tooth Trace Measurement>

Next, based on FIGS. 8 to 10, description will be given of a method for performing tooth trace measurement with the gear measuring device 11 on the basis of the control and computation of the control/computation device 22.

As shown in FIG. 8, in measuring a tooth trace HS of the tooth surface Wa of the workpiece W through multi-point continuous measurement using the touch probe 20, the Z and C axes are used to perform a base action and the Y axis is used to perform an oscillation action, for example.

Here, the base action refers to an action for moving the sensing element 21 of the touch probe 20 along an ideal tooth trace line of the tooth surface Wa of the workpiece W.

Moreover, the oscillation action is the same as that in the tooth profile measurement described above.

To describe the measurement procedure in detail, the workpiece W is first turned about the C axis to make a tooth space in the workpiece W face the sensing element 21 of the touch probe 20. Thereafter, the sensing element 21 is moved in the X-, Y-, and Z-axis directions to contact the tooth surface Wa of the workpiece W at a start point of the tooth trace measurement to thereby turn on the touch probe 20. In other words, the sensing element 21 is positioned to the start point of the tooth trace measurement.

Subsequently, from this state, the workpiece W is turned about the C axis in synchronization with the sensing element 21 of the touch probe 20 being moved in a Z-axis direction. Thus, the sensing element 21 performs a base action in which the sensing element 21 moves along the ideal tooth trace line (target tooth trace) of the workpiece W. During this base action, the sensing element 21 also performs an oscillation action in the Y-axis direction. As a result, the touch probe 20 performs the base action while switching between ON and OFF in a continuous manner at each measuring point through the oscillation action.

Based on FIG. 9, the base action and the oscillation action will be described in detail. Part (a) of FIG. 9 shows movement (base action) of the sensing element 21 in the Z-axis direction for moving the sensing element 22 along the ideal tooth trace line. In Part (a) of FIG. 9, the vertical axis represents the position (coordinate) in the Z-axis direction while the horizontal axis represents time. Part (b) of FIG. 9 shows turning (base action) of the workpiece W about the C axis for moving the sensing element 22 along the ideal tooth trace line. In Part (b) of FIG. 9, the vertical axis represents the rotational angle about the C axis while the horizontal axis represents time. By combining the movement of the sensing element 21 in the Z-axis direction and the rotation of the workpiece W about the C axis, the sensing element 21 can perform a base action allowing movement thereof along the ideal tooth trace line.

Figure 9C:
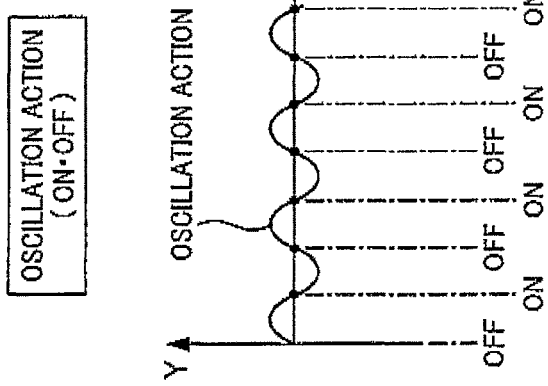
FIG. 9 is a diagram showing actions (base action and oscillation action) along/about drive axes (Z axis, Y axis, and C axis) performed in the tooth trace measurement with the gear measuring device.
Figure 9A:
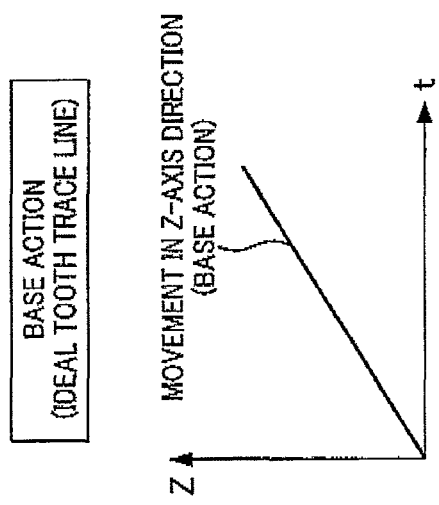
Figure 9B:
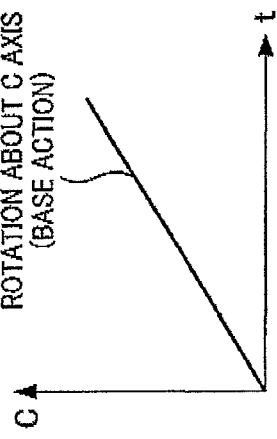

In addition to the base action of the Z-axis, an oscillation action in the Y-axis direction of the sensing element 21 is performed as shown in Part (c) of FIG. 9. In Part (c) of FIG. 9, the vertical axis represents the position (coordinate) in the Y-axis direction while the horizontal axis represents time.

With the oscillation action being added to the base action as described above, the touch probe 20 exhibits the oscillation action in the Y-axis direction (i.e., repeatedly increasing and decreasing the moving speed in the Y-axis direction) as shown in Part (c) of FIG. 9. Accordingly, the touch probe 20 repeats ON/OFF switching operations at a frequency corresponding to the frequency of the oscillation action. Specifically, during the base action, the oscillation action is continuously performed in which the sensing element 21 is brought into contact with the tooth surface Wa to turn on the touch probe 20 (i.e., to receive an ON signal from the touch probe 20), and thereafter the touch probe 20 is moved in the direction allowing the sensing element 21 to move away from the tooth surface Wa to turn off the touch probe 20 (i.e., to receive an OFF signal from the touch probe 20).

Note that described herein is an example where a sine periodic function is employed as the oscillation action, but the waveform of the oscillation action in the tooth trace measurement is not limited to the sine curve, as in the case of the tooth profile measurement. The oscillation action may have any waveform as long as it changes periodically, and may have a triangular waveform, for example.

Moreover, the frequency of the oscillation action may be set shorter if the number of measuring points is to be increased to improve the accuracy of the tooth trace measurement. That is, the number of measuring points for the tooth trace measurement can be easily changed by simply changing the frequency of the oscillation action.

The frequency of the oscillation action is not necessarily limited to a fixed frequency such as the sine curve in the illustrated example, and may be changed as needed.

Further, the amplitude of the oscillation action in the tooth trace measurement may be set in the same way as that in the tooth profile measurement described above (see Parts (a) and (b) of FIG. 5).

The description is given above of a case where the movement of the sensing element 21 in the Z-axis direction and the rotation of the workpiece W about the C axis are controlled to perform the base action for moving the sensing element 21 along the ideal tooth trace line and to perform the oscillation action with respect to movement of the sensing element 21 in the Y-axis direction. However, the combination of drive axes is not limited to this. Different combinations of drive axes may be used to perform the base action and the oscillation action.

Figures 10, 11:
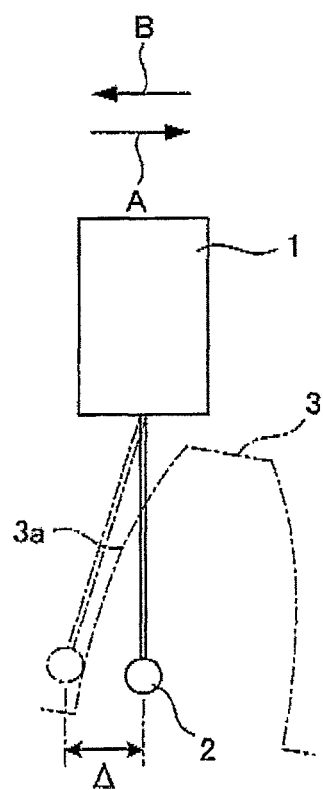
FIG. 10 is a table showing example combinations of drive axes for performing the base action and an axis (axes) for performing the oscillation action in the tooth trace measurement with the gear measuring device.
FIG. 11 is an explanatory diagram showing a touch probe of a related art.
Figure 12:
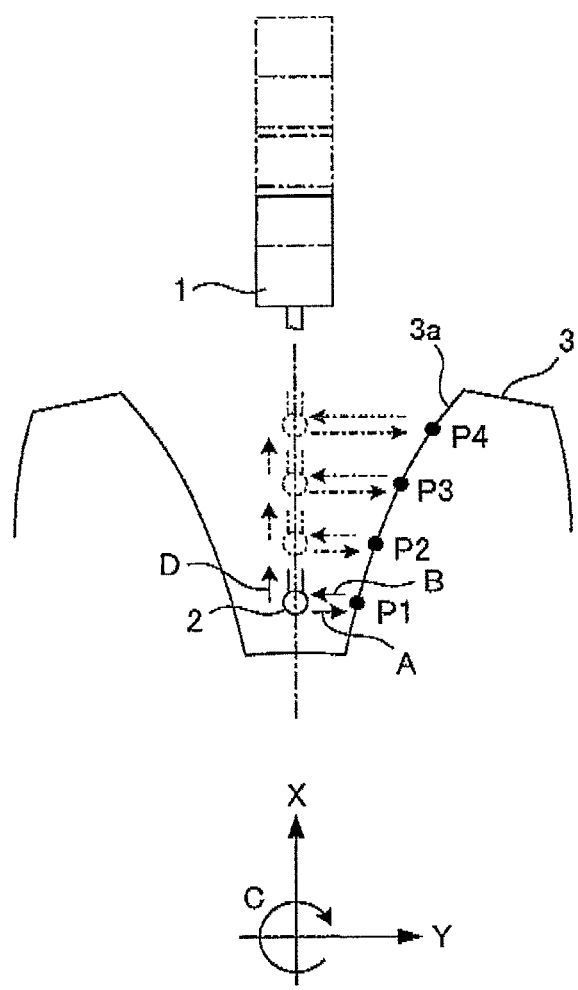
FIG. 12 is an explanatory diagram showing a gear measuring method of a related art using the touch probe.

To describe combinations of drive axes on the basis of FIG. 10, cases 11 to 15 are example combinations of drive axes for performing the base action and a drive axis (axes) for performing the oscillation action. Case 11 is the combination example of the case described above.

Besides case 11, if the Z and C axes are to be used to perform the base action, the drive axes shown in case 12 may be used for the oscillation action. Incase 12, the oscillation action is performed with respect to the rotation of the workpiece W about the C axis (repeated acceleration and deceleration of the rotational speed). In this case, the oscillation action is continuously performed in which the tooth surface Wa is brought into contact with the sensing element 21 to turn on the touch probe 20 (i.e., to receive an ON signal from the touch probe 20) and thereafter the tooth surface Wa is moved in a direction away from the sensing element 21 to turn off the touch probe 20 (i.e., to receive an OFF signal from the touch probe 20).

Moreover, for the base action, the movement of the sensing element 21 in the Z-axis direction, in the X-axis direction, and in the Y-axis direction may be controlled to perform a base action for moving the sensing element 21 along the ideal tooth trace line. In other words, the base action of the sensing element 21 may be performed in a Z/X/Y-axis direction to move the sensing element 21 along the ideal tooth trace line.

Then, in this case, the drive axis shown in cases 13 to 15 is used to perform the oscillation action. In case 13, the oscillation action is performed with respect to movement of the sensing element 21 in the Y-axis direction. In case 14, the oscillation action is performed with respect to movement of the sensing element 21 in the X/Y-axis direction. In case 15, the oscillation action is performed with respect to the rotation of the workpiece W about the C axis.

Note that the description is given above of tooth trace measurement in a case where the workpiece W is a helical gear as shown in FIG. 8; however, the present invention is also applicable to tooth trace measurement of a spur gear. If the workpiece W is a spur gear, then for the base action, the sensing element 21 of the touch probe 20 is simply moved in the Z-axis direction (base action) to allow movement thereof along the ideal tooth trace line. For the oscillation action, an oscillation action is performed with respect to movement of the sensing element 21 in the Y-axis direction, movement of the sensing element 21 in an X/Y-axis direction, or rotation of the workpiece W about the C axis, as in the case of the helical gear.

As described above, according to the gear measuring method of the embodiment, in the gear measuring method for measuring any one of a tooth profile and a tooth trace of a workpiece W by using a touch probe 20, the method is characterized in that the method comprises the steps of: performing a base action for moving a sensing element 21 of the touch probe 20 along any one of an ideal tooth profile line and an ideal tooth trace line of the workpiece W, the sensing element 21 being moved along the tooth profile line by controlling movement of the sensing element 21 and rotation of the workpiece W, and being moved along the tooth trace line by controlling either movement of the sensing element 21 and rotation of the workpiece W or movement of the sensing element 21; and during the base action, performing continuously any one of an oscillation action for bringing the sensing element 21 into contact with a tooth surface Wa of the workpiece W to receive a first signal (ON signal or OFF signal) from the touch probe 20 and thereafter moving the touch probe 20 in a direction allowing the sensing element 21 to move away from the tooth surface Wa of the workpiece W to receive a second signal (OFF signal or ON signal) from the touch probe 20, and an oscillation action for bringing the tooth surface Wa of the workpiece W into contact with the sensing element 21 to receive the first signal (ON signal or OFF signal) from the touch probe 20 and thereafter moving the tooth surface Wa of the workpiece W in a direction away from the sensing element 21 to receive the second signal (OFF signal or ON signal) from the touch probe 20. Thus, performing the oscillation action along with the base action allows continuous switching between the first signal and the second signal (continuous ON/OFF switching) of the touch probe.

Accordingly, the time required for tooth profile measurement or tooth trace measurement can be significantly reduced as compared to the conventional method. Moreover, the number of measuring points can be easily increased by simply changing the frequency of the oscillation action. Thus, a long measuring time, which is required in the conventional case, is no longer required even when the number of measuring points is increased.

Note that although the above description regards the base action as movement along the ideal tooth profile/trace line, the base action is not necessarily limited to this. Instead, the base action may be movement along a tooth profile/trace line determined through computation.

Specifically, the base action may not necessarily be limited to movement along the ideal tooth profile/trace line; the base action may be movement along any tooth profile/trace line determined by means of a computation device such as a personal computer, thus moving the sensing element along a path different from the ideal tooth profile/trace line.

For example, if the tooth profile/trace is recognized as having a given amount of inclination through a simulation or the like before measuring the gear, it is possible that an action (movement) along a tooth profile/trace line inclined by that inclination amount from the ideal tooth profile/trace line is given as the base action.

In this case too, the same effect as the ideal tooth profile/trace line can be achieved. That is, in addition to the base action allowing the movement along the tooth profile/trace line determined through computation, an oscillation action is performed continuously during the base action, so that the switching between the first signal and the second signal of the touch probe (ON/OFF switching) can be performed continuously along with the base action.

INDUSTRIAL APPLICABILITY

The present invention relates to a gear measuring method and is suitably applied to a case where tooth profile measurement and tooth trace measurement of a gear are performed using a touch probe.

EXPLANATION OF REFERENCE NUMERALS 11 gear measuring device
12 base
13 guide rail
14 rotary table
15 movable body
16 guide rail
17 movable body
18 guide rail
19 movable body
20 touch probe
21 sensing element
22 control/computation device
HG tooth profile
HS tooth trace
W workpiece (gear)
Wa tooth surface

The invention claimed is:

1. A gear measuring method for measuring any one of a tooth profile and a tooth trace of a gear by using a touch probe, the method comprising:
performing a base action for moving a sensing element of the touch probe along any one of an ideal tooth profile line of the gear and a computed tooth profile line by controlling movement of the sensing element and rotation of the gear, or along any one of an ideal tooth trace line of the gear and a computed tooth trace line by controlling movement of the sensing element and rotation of the gear or by controlling the movement of the sensing element,
during the base action, performing continuously any one of an oscillation action for bringing the sensing element into contact with a tooth surface of the gear to receive a first signal from the touch probe and thereafter moving the touch probe in a direction allowing the sensing element to move away from the tooth surface of the gear to receive a second signal from the touch probe, and
an oscillation action for bringing the tooth surface of the gear into contact with the sensing element to receive the first signal from the touch probe and thereafter moving the tooth surface of the gear in a direction away from the sensing element to receive the second signal from the touch probe.

2. The gear measuring method according to claim 1, wherein
the method is for measuring the tooth profile of the gear,
the base action for moving the sensing element along the any one of the ideal tooth profile line and the computed tooth profile line is performed by controlling movement of the sensing element in an X-axis direction perpendicular to a rotation center of the gear and in a Y-axis direction perpendicular to the X-axis direction and parallel to a radial direction of the gear, and rotation of the gear about a C axis coaxial with the rotation center, and
the oscillation action is performed with respect to any one of the movement of the sensing element in the Y-axis direction, the movement of the sensing element in the X-axis direction and the Y-axis direction, and the rotation of the gear about the C axis.

3. The gear measuring method according to claim 2, wherein
in the base action, any one of an amount of the movement of the sensing element in the X-axis direction and an amount of the movement of the sensing element in the Y-axis direction is set to 0, and
the oscillation action is performed with respect to any one of the movement of the sensing element in the Y-axis direction and the rotation of the gear about the C axis.

4. The gear measuring method according to claim 1, wherein
the method is for measuring the tooth trace of the gear,
the base action for moving the sensing element along the any one of the ideal trace profile line and the computed tooth trace line is performed by controlling movement of the sensing element in a Z-axis direction parallel to a rotation center of the gear and rotation of the gear about a C axis coaxial with the rotation center, or by controlling movement of the sensing element in the Z-axis direction, in an X-axis direction perpendicular to the rotation center, and in a Y-axis direction perpendicular to the X-axis direction and parallel to a radial direction of the gear, and
the oscillation action is performed with respect to any one of the movement of the sensing element in the Y-axis direction and the rotation of the gear about the C axis, or with respect to any one of the movement of the sensing element in the Y-axis direction, the movement of the sensing element in the X-axis direction and the Y-axis direction, and the rotation of the gear about the C axis.

* * * * *